United States Patent Office 2,797,160
Patented June 25, 1957

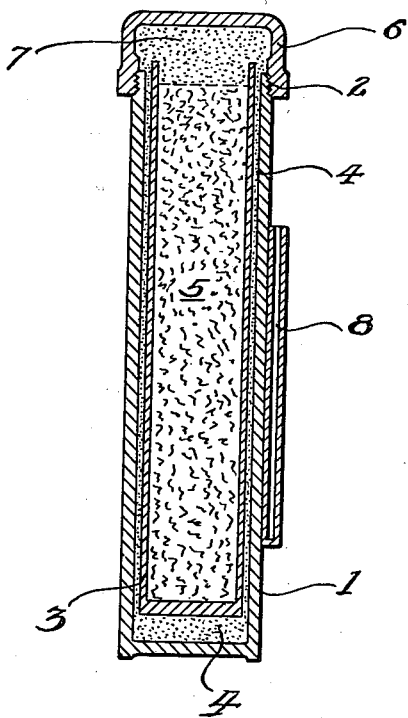
INVENTORS:
BY Frank H. Spedding
Harley F. Wilhelm
Wayne H. Keller
Roland G. Anderson
Attorney:

2,797,160

PRODUCTION OF ZIRCONIUM

Frank H. Spedding and Harley A. Wilhelm, Ames, Iowa, and Wayne H. Keller, St. Louis, Mo., assignors to the United States of America as represented by the United States Atomic Energy Commission Application September 7, 1951, Serial No. 245,468

8 Claims. (Cl. 75—84.4)

This invention deals with a process for the production of zirconium and zirconium-base alloys from zirconium halides, in particular from zirconium tetrafluoride. Zirconium and zirconium-base metals have widespread use as construction materials on account of their hardness and corrosion-resistance.

It is an object of this invention to provide a process for producing zirconium metal in pure and massive form.

It is another object of this invention to provide a process for producing zirconium which is free of oxygen and consequently nonbrittle.

It is another object of this invention to provide a process for producing zirconium metal of great ductility.

It is another object of this invention to provide a process for producing zirconium metal wherein zirconium is formed in molten form by an instantaneous reaction so that the time of extreme heat and thus for possible reaction of the molten zirconium with the crucible material is reduced.

It is also an object of this invention to provide a process for producing zirconium metal in which a low-melting, nonreacting slag is obtained.

These and other objects are accomplished by preparing a mixture of zirconium tetrafluoride and a reducing metal and heating this mixture in a closed reactor whereby a regulus of metallic zirconium and a layer of slag are formed, cooling the reaction products to about room temperature, and separating the zirconium from the slag. In carrying out the invention, a so-called booster material, in particular iodine or sulfur, is added to the reaction mixture; the booster is a substance which reacts with the reducing metal in a reaction more exothermic than that of the reduction of the zirconium tetrafluoride. It is very advantageous to add also an alloying metal in the form of a compound which as such functions as a booster so that with this one compound the dual purpose of furnishing heat and the alloying metal is attained.

Alkali metals and alkaline earth metals are suitable as reducing agents, and in particular magnesium and calcium have been found to yield satisfactory results. Calcium is the preferred reducing metal; it has been found advisable to use an excess over the stoichiometric quantity necessary for the reduction of the zirconium tetrafluoride and also of the booster material. An excess of at least 10% over the stoichiometric quantity is preferred, and about 25% excess is best. The calcium or other reducing metal, as well as all reactants, are advantageously used in pure form in order to obtain a pure zirconium metal or alloy. For this reason calcium metal, for instance, is redistilled prior to its use.

The compound formed from the reducing metal and the booster is a flux by which a low-melting slag is secured so that reaction between the slag and the crucible is reduced to a minimum.

In addition to lowering the melting point of the slag by the compound formed from the booster, it is also advantageous to add an alloying metal to the charge in order to obtain a zirconium alloy of a melting point lower than that of zirconium. If zirconium is to be finally obtained in pure metallic form, it is wise to choose the alloying metal so that its removal from the alloy does not cause any difficulty. Zinc or cadmium metal have been found suitable, zinc being the preferred alloying agent. The addition of an alloying metal has the further advantage that it alloys with the metallic zirconium as it is formed; by this the zirconium yield is increased.

While zinc, for instance, may be added in metallic form, it may also be formed during the reaction; for instance, in some cases zinc fluoride or zinc chloride was added to the charge and the quantity of reducing metal accordingly increased so that the reduction of the zinc fluoride or zinc chloride was secured and a zirconium-zinc alloy was obtained. If, of course, the aim of the process is the production of an alloy of specific properties, the alloying metal is preferably chosen correspondingly. Zirconium alloys which have been prepared by the process of this invention are those containing any of the following ingredients: Bi, Pb, Pt, V, Cb, Mo, Cr, Pd, Ta, Sn and V; with the exception of vanadium, which was obtained by coreducing vanadium trifluoride, the components were added as the metals.

Zinc chloride and/or zinc fluoride, when used as just described, also act as an additional booster material; their use is therefore advantageous for the process of this invention. Zinc chloride, which is hygroscopic, is preferably added after being vacuum dried.

The optimal molal ratio, in the case of iodine as the booster material, for iodine to zirconium tetrafluoride was found to be 0.35 if zinc was present, but 0.75 without the addition of zinc. With these quantities about 98% of the zirconium present were recovered in metallic form. In the case of sulfur, a molal ratio of from 0.208 to 0.425 yielded an output between 90–95% with zinc, while without zinc and a molal ratio of 1 (1 gram atom of sulfur to 1 gram mole of $ZrF_4$) a yield of 95–98% was obtained. The excess of calcium was 10% in all these instances.

The materials are preferably used in disintegrated form and mixed thoroughly. Particle sizes found advantageous, however not critical, are −100 mesh for zirconium tetrafluoride, 10 mesh for calcium, −20 mesh for iodine, about 100 mesh for sulfur and about 20 mesh for zinc chloride; zinc has been used with satisfaction in the form of turnings of approximately one-half grain each and a thickness of 0.005 in.

In the attached drawing, an apparatus is illustrated, in a longitudinal sectional view, that has been used with satisfaction for the process of this invention. In this drawing, the reference numeral 1 indicates a reduction bomb made of a steel pipe of an inner diameter of 2.5 in. and a length of 13 in. and a welded bottom. The top of the bomb is threaded as indicated at 2. A pre-sintered liner 3 is inserted into this bomb which is formed of electrically fused dolomitic oxide. Calcium oxide and, in some cases, graphite have also been found suitable as liner materials. The liner has side walls ⅛ in. thick and an inner diameter of 2 in. which leaves an interspace of ⅛ in. on each side. This interspace is filled with magnorite 4 whereby the liner is supported sufficiently to avoid any mechanical damage during operation. The disintegrated and thoroughly mixed charge 5 fills the liner almost to its top; it has been compacted by stamping or jolting. The cap 6 which has been prepacked with dolomitic oxide 7 is screwed to the top by means of threads corresponding to those of the bomb indicated by reference numeral 2. The threads of the cap and/or the bomb are covered with a pipe joint cement in order to warrant a pressure-tight seal. At the outside side wall there is arranged a well 8 adapted to receive a thermocouple.

Before and/or after the bomb was packed with the charge and prior to sealing, the oxygen was removed, for instance, by flushing with argon with or without intermittent evacuation. The sealed bomb was then inserted in the cold state into the pit of a gas-fired furnace which had a temperature of about 700° C. When sulfur was used as the booster, the reaction started after five minutes which was indicated by a sudden acceleration of temperature increase. The temperature of the reaction mass at that time was approximately 450° C. In the case of an iodine booster the reaction started at approximately 550° C. after fourteen minutes of preheating. It was observed that during the reaction proper a temperature increase of about 300° per minute took place while a normal heating rate would have brought about an increase of 25–50° per minute. After three minutes the entire process was completed. This instantaneous course of the reaction is responsible for a minimum of heat loss.

After the reaction had terminated, the bomb was allowed to cool to room temperature by taking it out of the furnace; this took approximately one and one-half hours. Thereafter, the material was hammered out of the liner or crucible. At the bottom of the reaction mass, a regulus of zirconium metal was usually found of a thickness of about 1 in. and thereover a slag layer of about 4 in. thickness. The output in a bomb of the dimensions described usually ranged from 200–220 g. of zirconium.

A relatively large scale operation was carried out successfully with a bomb constructed similarly to the one described but having an inside diameter of 4 in. and a length of 15 in. In this case, the liner was not preformed by sintering but by jolt-packing the electrically fused dolomitic oxide around a mandrel in the bomb; the intermediate layer of magnorite was omitted in this instance. An output of from 700–750 g. of zirconium was accomplished in this larger bomb. The relative yield in this instance was slightly lower, though, because the jolt-packed liner had a higher porosity than the presintered one and absorbed some of the zirconium formed.

Whether zirconium was obtained in metallic form or in the form of an alloy, purification or separation was necessary in order to remove foreign undesirable ingredients. For this purpose, the crude metal was placed into a tantalum cup and the cup into a graphite crucible; the crucible with the cup was then inserted into a quartz envelope, and the entire assembly was heated by induction while applying a high vacuum. The temperature used was as low as 900° C.; with 1100° C. 90% of the zinc was removed. Higher temperatures, such as up to 1700° C. increased the rate of volatilization. Heating to that temperature was carried out relatively slowly within about one and one-half hours, and the maximum temperature was then maintained for about two and one-half hours. Under these conditions all volatile ingredients such as zinc, calcium, magnesium, iodine and sulfur were removed. A highly pure metal was obtained by the distillation process which was immediately usable for casting into the desired shape.

In the following, a number of preferred embodiments of the process of this invention are described.

*Example I*

Four hundred grams of zirconium tetrafluoride, 40 g. of zinc, 64 g. of iodine and 223 g. of calcium metal were thoroughly mixed and filled into the smaller of the two bombs described after it had been alternately evacuated and filled with argon gas three times. The bomb was capped and inserted into the gas-heated furnace and heated for reaction followed by cooling as described above. The regulus obtained consisted of a zirconium-zinc alloy of a zirconium content of 85% by weight. The total zirconium output amounted to about 97%. Zinc, calcium, etc. were then removed by induction heating in a vacuum. The zirconium metal obtained after vacuum distillation was analyzed and found to contain:

|    | P. p. m. |
|----|----------|
| Al | 20–30 |
| B  | 1.2–3.3 |
| Ca | 10–60 |
| Co | <10 |
| Cr | <10 |
| Cu | 10–50 |
| Fe | 150–300 |
| C  | 300–500 |
| Mg | 5–15 |
| Ni | <10 |
| Si | 30–100 |
| Ti | 10–20 |
| Mn | 15–25 |
| N  | 60–175 |
| Zn | 5–40 |

It had a hardness of 47 Rockwell, scale A. The identical experiment except that 80 g. of zinc were used with otherwise the same amounts of the same ingredients given above yielded a more ductile zirconium metal of a hardness of 41 Rockwell, scale A.

Another analogous experiment was carried out in the larger of the two bombs described using a charge of 1400 g. of zirconium tetrafluoride, 140 g. of zinc, 225 g. of iodine and 780 g. of calcium. The operating steps and conditions were identical with those of the small scale operation. The yield in this instance was 92% of zirconium.

*Example II*

Another experiment was carried out in the small laboratory bomb which was analogous to that of Example I but in which sulfur was used as the booster material. The charge consisted of 400 g. of zirconium tetrafluoride, 30.9 g. of zinc, 16 g. of sulfur, and 233 g. of calcium. The yield ranged from 93–97% in various runs, the zirconium again being obtained as a zirconium-zinc alloy.

*Example III*

Three hundred thirty-one grams of zirconium tetrafluoride, 66 g. of sulfur and 263 g. of calcium were heated as described in the previous examples. A yield of from 95–98% of zirconium in metallic form was obtained.

*Example IV*

Four hundred grams of zirconium tetrafluoride, 26.9 g. of zinc chloride, 202 g. of iodine and 255 g. of calcium were reacted as described above; they yielded 97% of zirconium in the form of a zirconium-zinc alloy.

*Example V*

Three hundred grams of zirconium tetrafluoride having a particle size of —100 mesh were mixed with 338 g. of iodine and 225 g. of calcium. A yield of 99% of zirconium in metallic form was obtained.

While in all the instances illustrated above, a yield of above 90% was obtained, experiments carried out with sulfates, chlorates, and other oxygen-containing salts as the booster developed too high a reaction heat which entailed a number of difficulties including reaction with the liner and thus made the operation of the process unsatisfactory.

Substitution of other zirconium halides for the zirconium tetrafluoride in the reduction with calcium using iodine or sulfur as the booster was not investigated, because comparative experiments with zinc chloride as booster indicated the inferiority of other halides as compared with zirconium tetrafluoride. For instance, reduction of potassium fluorozirconate under these conditions yielded an output of 60% zirconium, and that of zirconium tetrachloride an output of 71%, while the yields of reduction of zirconium tetrafluoride with calcium and zinc chloride as booster varied between 90 and 95%.

It will be understood that this invention is not to be limited to the details given herein but that it may be modified within the scope of the appended claims.

This application is a continuation-in-part of our co-pending applications Serial No. 628,652, filed November 14, 1945, and Serial No. 695,299, filed September 6, 1946, now Patent No. 2,782,116 dated February 19, 1957.

What is claimed is:

1. A process for producing massive zirconium metal, comprising mixing zirconium tetrafluoride, zinc, a reducing metal selected from the group consisting of alkali metals and alkaline earth metals, and a booster substance selected from the group consisting of iodine and sulfur, said reducing metal being used in a quantity excessive of that stoichiometrically required and the molal ratio of booster to zirconium tetrafluoride being 0.105 in the case of iodine and from 0.208 to 0.425 in the case of sulfur; heating the mixture thus obtained in a closed system to at least 450° C. whereby a regulus of metallic zirconium and a slag layer form; cooling the reaction products to about room temperature; and separating the zirconium from the slag.

2. The process of claim 1 wherein the reducing metal is calcium.

3. The process of claim 2 wherein the calcium is used in an excess of at least 10% of that theoretically required.

4. The process of claim 3 wherein 25% by weight of calcium is used in excess over that stoichiometrically required.

5. The process of claim 2 wherein the booster is iodine.

6. The process of claim 2 wherein the booster is sulfur.

7. The process of claim 1 wherein the zirconium separated from the slag is subjected to a high vacuum distillation at a temperature up to 1700° C. whereby zinc and volatile impurities are removed.

8. A process for producing zirconium, comprising the steps of mixing 400 parts by weight of zirconium tetrafluoride, 40 parts by weight of zinc, 64 parts by weight of iodine and 223 parts by weight of calcium, heating the mixture while excluding oxygen and oxygen-containing materials to at least 450° C., cooling the reaction mixture after completed reaction, mechanically separating a zirconium-zinc alloy formed from a slag formed, and subjecting said alloy to a high-vacuum distillation at about 1700° C.

No references cited.